United States Patent [19]
Hodsdon et al.

[11] 3,969,796
[45] July 20, 1976

[54] RELEASABLE FASTENING ARRANGEMENT FOR A RADIO HOUSING AND A BATTERY HOUSING

[75] Inventors: Roy F. Hodsdon; Friedrich H. Mann, both of Lynchburg, Va.

[73] Assignee: General Electric Company, Lynchburg, Va.

[22] Filed: Sept. 17, 1975

[21] Appl. No.: 614,260

[52] U.S. Cl................................. 24/270; 325/16; 339/91 R
[51] Int. Cl.²................... H01R 13/54; H01B 1/38
[58] Field of Search............ 325/16, 111, 114, 185, 325/353, 361; 24/270; 339/91 R

[56] References Cited
UNITED STATES PATENTS

| | | | |
|---|---|---|---|
| 2,337,987 | 12/1943 | Galloway | 325/361 |
| 2,935,606 | 5/1960 | Harrison et al. | 325/16 |
| 2,984,740 | 5/1961 | Madland et al. | 325/16 |
| 3,093,773 | 6/1963 | Cole | 339/91 R X |
| 3,409,859 | 11/1968 | Krehbiel | 339/91 R |
| 3,728,664 | 4/1973 | Hurst | 325/16 X |

*Primary Examiner*—Donald A. Griffin
*Attorney, Agent, or Firm*—James J. Williams

[57] ABSTRACT

A reliable but releaseable arrangement for fastening a radio housing and a battery housing together is provided by a tongue and groove respectively positioned at one end of the housings, and by a hasp and catch respectively positioned at a second end of the housings. Separating surfaces are provided on the facing surfaces of the two housings between the one end and the second end so that the housings separate on impact and reduce the shock to apparatus in the housings.

4 Claims, 7 Drawing Figures

# RELEASABLE FASTENING ARRANGEMENT FOR A RADIO HOUSING AND A BATTERY HOUSING

BACKGROUND OF THE INVENTION

Our invention relates to releaseable fastenings, and particularly to a releaseable fastening that holds a radio housing and a battery housing together, but that causes or permits the two housings to separate on impact, and thereby reduce the shock to apparatus in the housings.

Portable, self-contained radio equipment, particularly two-way radio equipment, frequently has one housing for the radio equipment and a second housing for the batteries that power the radio equipment. For reliable operation and use, the two housings should be securely fastened together. However, in order to replace the batteries, the two housings should be easily separated.

Accordingly, a primary object of our invention is to provide a new and improved releaseable fastening arrangement for two housings.

Another object of our invention is to provide a new and improved arrangement that securely but releaseably fastens a radio housing and a battery housing together.

By their inherent nature, portable radios are subject to being dropped or struck. The resultant shock can easily damage the relatively fragile radio equipment, so that any reduction of shock and resultant damage is highly desirable.

Accordingly, another and relatively specific object of our invention is to provide a fastening arrangement for a radio housing and a battery housing that permits or causes the two housings to separate under impact, thus dissipating energy that would otherwise cause shock and damage to the equipment.

SUMMARY OF THE INVENTION

Briefly, these and other objects are achieved in accordance with our invention by a tongue and groove arrangement respectively positioned on first corresponding ends of the two housings for releaseably holding the two housings together at their first ends. A spring loaded hasp and catch arrangement are respectively positioned on second corresponding ends of the two housings for releaseably holding the two housings together at their second ends. Sloped separating surfaces are correspondingly positioned on the facing surfaces of the two housings between their first and second ends. When the two housings are to be fastened, the tongue and groove are joined, and the facing surfaces brought together. The hasp is engaged with the catch, to complete the fastening. Under impact, the separating surfaces cause the two housings to separate. This separation reduces or dissipates the energy, and thus reduces the shock to the equipment which would otherwise result from the impact.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF A PREFERRED EMBODIMENT

Figure 1:
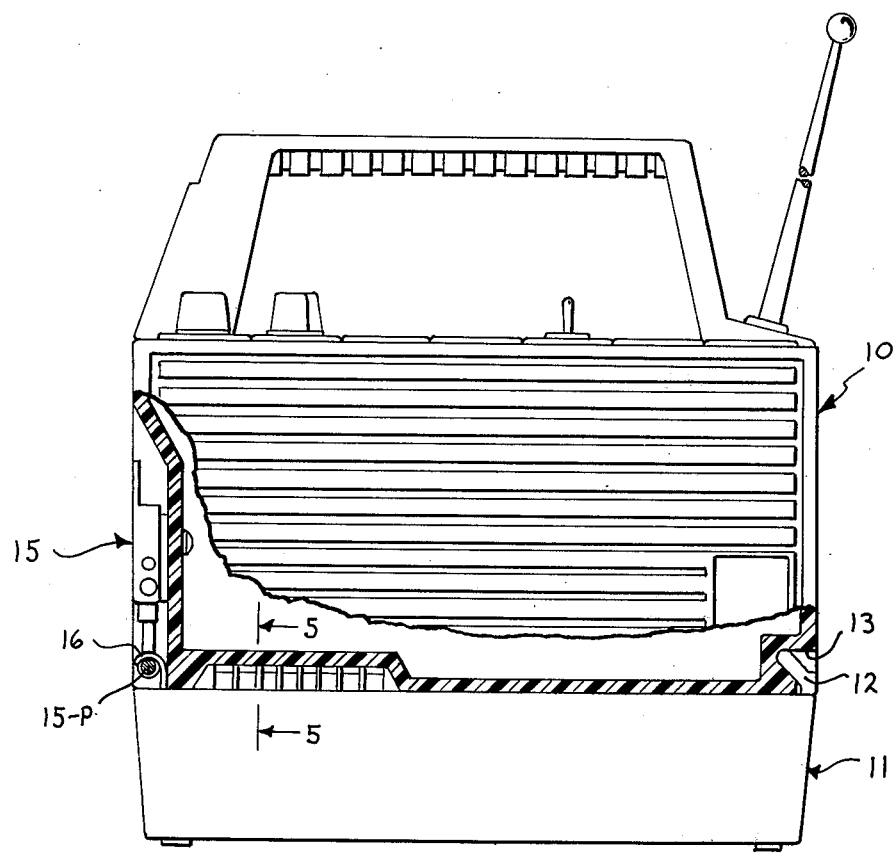
FIG. 1 shows a side elevation view, with parts broken away and in cross-section, of a radio housing and a battery housing fastened together with the releaseable fastening arrangement in accordance with our invention.

In the drawing, we have shown one preferred example of where the releaseable fastening arrangement of our invention can be used. This example is a portable, two-way radio which typically is powered by batteries carried with the radio in order that the radio can be easily and freely used. Such batteries are fairly heavy, and are considerably heavier than the radio apparatus. While the batteries can be damaged, they are stronger or more rugged than the fairly delicate or fragile radio apparatus, particularly piezoelectric crystals and other ceramic or similar materials used in the radio. Hence, if the radio is struck or dropped, the relatively heavy batteries provide inertia which results in shock to the radio, almost always damaging the radio apparatus and frequently damaging the batteries. For these and other reasons, some means are needed to reduce the effects of this shock and damage to the batteries and the relatively fragile radio apparatus. Our releaseable fastening arrangement provides such a reduction.

Figure 2:
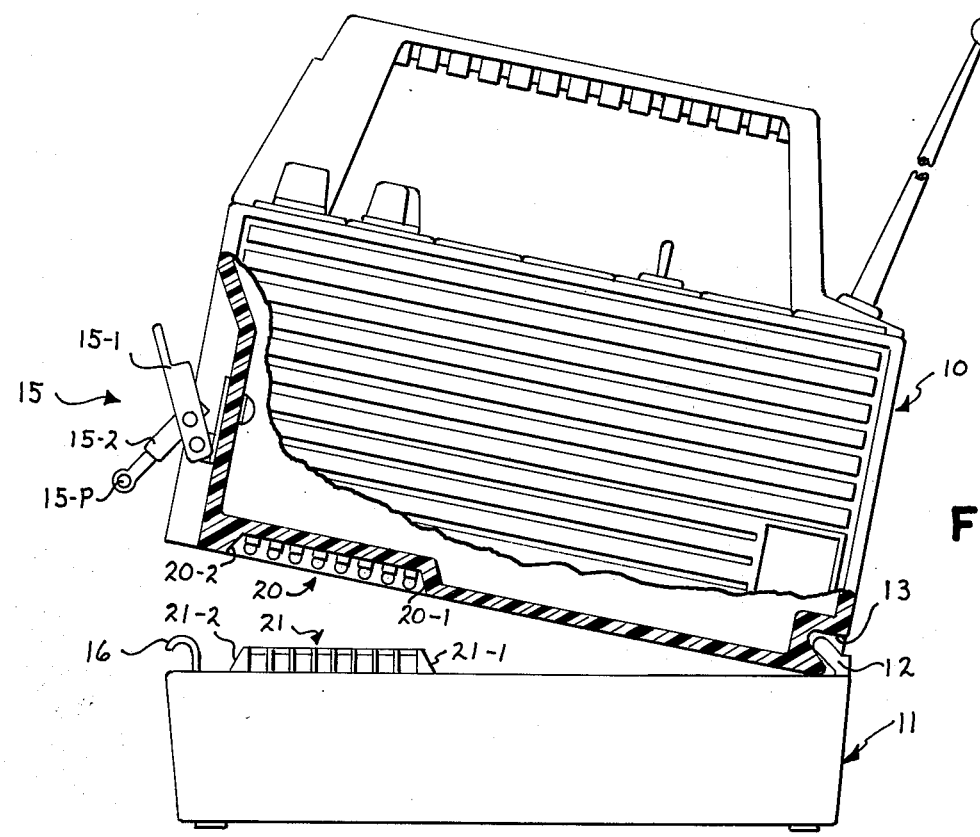
FIG. 2 shows a side elevation view, with parts broken away and in cross-section, of a radio housing and a battery housing partly separated by the releaseable fastening arrangement of our invention.
Figure 3:
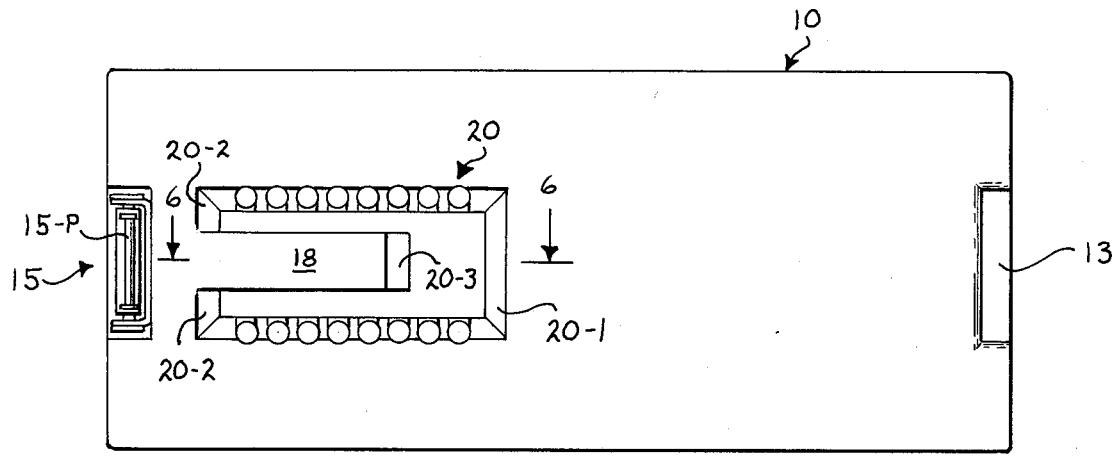
FIG. 3 shows a plan view of the surface of the radio housing that faces the battery housing in accordance with our invention.
Figure 4:
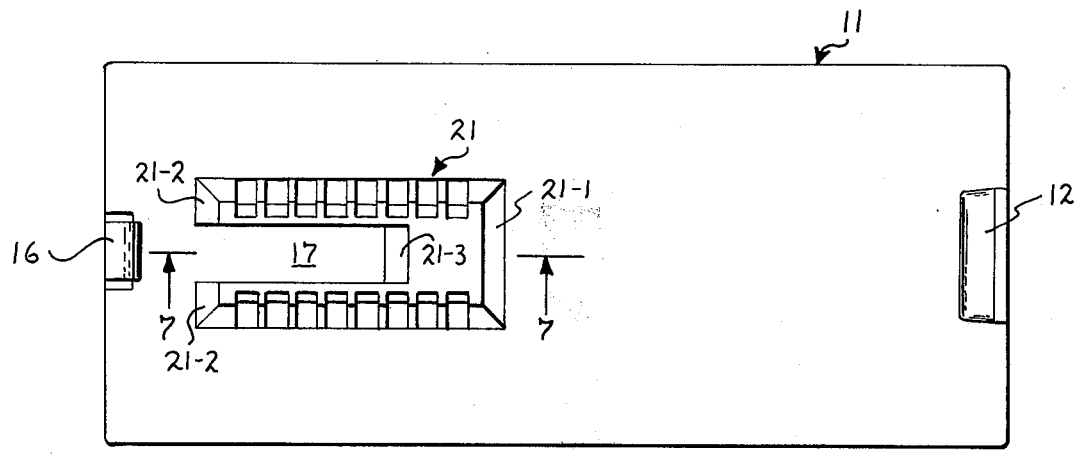
FIG. 4 shows a plan view of the surface of the battery housing that faces the radio housing in accordance with our invention.
Figure 5:
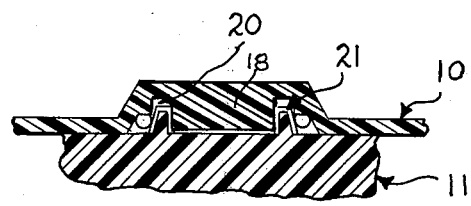
FIGS. 5, 6, and 7 show cross-sectional views, taken along the lines 5—5, 6—6, and 7—7 in FIGs. 1, 3, and 4 respectively, of the housing separating surfaces in accordance with our invention.
Figure 6:
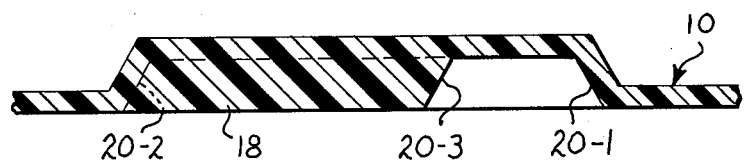
Figure 7:
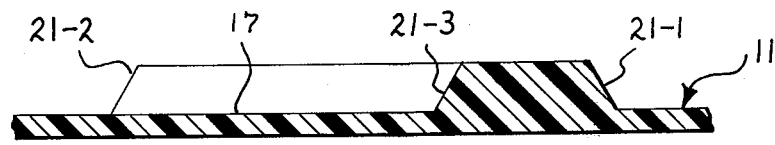

In FIGS. 1 and 2, we show a radio housing 10 and a battery housing 11 provided with our releaseable fastening arrangement. Typically, the radio housing 10 contains relatively light apparatus, and the battery housing 11 contains relatively heavy battery material. In accordance with our invention, the housings 10, 11 are joined together at a first end (the right end as viewed in FIGS. 1 and 2) by a tongue 12 and groove 13 arrangement. We prefer that the tongue 12 extends upward toward the other end at an acute angle, 45° for example, and that the tongue 12 and groove 13 have a width that is between one-third and one-half the width of the housings 10, 11. However, these angles and dimensions can be varied. If, as is typical, the housings 10, 11 are formed of molded plastic, the tongue 12 and groove 13 can be an integral part of the housings. While it is not essential, we prefer that the tongue 12 be attached to or part of the battery housing 11, and that the groove 13 be formed in or part of the radio housing 10. At the second end (the left end as viewed in FIGS. 1 and 2) of the housigs 10, 11 we provide a hasp 15 and catch 16 arrangement. While it is not essential, we prefer that the hasp 15 be attached to the radio housing 10 and that the catch 16 be attached to the battery housing 11. As shown in FIG. 2, the hasp 15 comprises a first arm 15-1 pivotally attached to the radio housing 10, and a second arm 15-2 pivotally attached to the first arm 15-1. The second arm 15-2 carries a pin 15-P which is adapted to engage the catch 16. The pin 15-P is spring loaded or urged toward the pivot of the second arm 15-2. A hasp as just described is commercially available model number SC-B-83314-2 manufactured by Nielsen Hardware Corp. of Hartford, Conn. A recess 20 having one or more sloped separating surfaces 20-1, 20-2, 20-3 is provided in the lower surface of the radio housing 10, and a projection 21 having one or more sloped separating surfaces 21-1, 21-2, 21-3 is provided on the upper surface of the battery housing 11. In addition to providing the separating function in accordance with our invention, the recess 20 and the projection 21 may carry electrical contacts that provide connections between the batteries in the housing 11 and the radio apparatus in the housing 10. These contacts may have fixed pins on recess 20 which contact spring-like elements on the projection 21.

The function and operation of our fastening arrangement is explained as follows: With reference to FIG. 2, when the radio housing 10 is to be fastened to the battery housing 11, the housing 10 is positioned and tilted so that the groove 13 surrounds and engages the tongue 12 as shown in FIG. 2. The other ends of the radio housing 10 and the battery housing 11 are then pivoted about the tongue 12 and groove 13 until the housings 10, 11 are in contact or close to each other. Proper alignment is provided by a projection or key 18 (located in the recess 20) which fits into a recess or slot 17 (located in the projection 21) as shown in FIGS. 3, 4, 6, and 7. With the hasp arms 15-1, 15-2, in the approximate position shown in FIG. 2, the first hasp arm 15-1 is pivoted in a counterclockwise direction (as viewed in FIG. 2) until the hasp pin 15-P is under the concave retaining surface of the catch 16. The first arm 15-1 is then pivoted in a clockwise direction (as viewed in FIG. 2), and this pulls the hasp pin 15-P upward and against the concave surface of the catch 16 so that the pin 15-P firmly engages the catch 16 under the spring loading provided in the second arm 15-2. The first arm 15-1 is further pivoted in a clockwise direction until it engages the surface of the housing 10 as shown in FIG. 1. In this condition, the housings are aligned and firmly held together, with the projection 21 and the recess 20 in substantial registry and occupying the relative and corresponding positions as shown in FIG. 1. Thus, the two housings 10, 11 are securely fastened to each other. It will be noted that only one hasp 15 and catch 16 arrangement is used, and this permits the first or right hand end having the tongue 12 and groove 13 arrangement to be free to accept or carry other objects mounted on it.

If the joined housings 10, 11 are subjected to impact, such as by striking or dropping, they are separated by our fastening arrangement so as to provide some release of energy or momentum, thus reducing the shock to the fragile radio apparatus and the batteries. This separation is brought about by the tongue 12 and groove 13 and corresponding sloped separating surfaces on the projection 21 and on the recess 20. These surfaces are shown in detail in FIGS. 3, 4, 5, 6, and 7. The recess 20 has sloped surfaces 20-1, 20-2 at its two ends and a sloped surface 20-3 on its key 18. The projection 21 has sloped surfaces 21-1, 21-2 at its two ends and a sloped surface 21-3 on its slot 17. When the housings are joined together as shown in FIG. 1, these sloped or bevelled surfaces are close to one another. Specifically the surfaces 20-1, 21-1 are close to each other; the surfaces 20-2, 21-2 are close to each other; and the surfaces 20-3, 21-3 are close to each other. The key 18 is in registry with the slot 17. Any impact causes relative movement between the two housings 10, 11 because of their difference in mass or inertia. This relative movement causes the sloped or bevelled surfaces to be forced against each other respectively so that the surface 20-1 engages the surface 21-1, or the surface 20-2 engages the surface 21-2, or the surface 20-3 engages the surface 21-3. Also the tongue 12 engages the groove 13. This engagment causes a camming or separating action which overcomes the spring loading on the hasp 15, and causes the two housings 10, 11 to separate such as shown in FIG. 2. And as mentioned, this separation provides an absorption of momentum or energy, thus materially reducing the shock to the apparatus in the housings, particularly the radio housing 10.

It will be seen that we have provided a new and improved releaseable fastening arrangement. This arrangement is very desirable in applications such as shown in the drawing, since it requires only one hasp and catch, thus permitting the end having the tongue and groove to be free to accept or hold other equipment. The tongue and groove at one end and the sloped surfaces between the ends permit the housings to be easily joined under bad lighting conditions or in almost any location, since these features make the housings self-locating or self-orienting. When the housings are positioned together, they can then be reliably joined or fastened together by one easy operation of the hasp. Thus, it is easy to replace batteries. Further, while the housings are reliably held together, they will separate under impact and reduce the shock and damage to the equipment. While we have shown only one embodiment persons skilled in the art will appreciate that modifications may be made. For example, the tongue and groove arrangement may be reversed so that the tongue 12 is on the housing 10 and the groove 13 on the housing 11. Similarly, the hasp and catch arrangement may be reversed so that the hasp 15 is on the housing 11 and the catch 16 is on the housing 10. The tongue and groove can be separate pieces attached to the housing, and the catch can be integral with its housing. The projection 21 and the recess 20 may also be reversed so that the recess 20 is on the housing 11 and the projection 21 is on the housing 10. However, since the housing 10 may sometimes be rested on its lower surface without the housing 11, it is preferable that the recess 20 be on the housing 10. The projection 21 and the recess 20 may carry electrical contacts of types other than those shown. Finally, additional housings may be held in a similar fashion below the housing 11, or between the housing 10 and the housing 11 in a sandwich-like configuration without an additional fastening arrangement. Therefore, while our invention has been described with reference to a particular embodiment, it is to be understood that modifications may be made without departing from the spirit of the invention or from the scope of the claims.

What we claim as new and desire to secure by Letters Patent of the United States is:

1. An improved arrangement for releasably fastening a radio housing or the like to a battery housing or the like comprising:
   a. a retaining projection mounted on the upper surface of the battery housing near a first end thereof, said retaining projection extending at an acute angle from said upper surface toward a second end of said battery housing opposite said first end;

b. a first retaining member mounted on said battery housing near said second end thereof, said first retaining member having a retaining surface facing in a direction generally toward the bottom of said battery housing;

c. a separating projection mounted on said upper surface of said battery housing between said ends thereof, said separating projection having at least one separating surface that slopes upwardly from said upper surface in a direction from one of said ends toward the other of said ends of said battery housing;

d. a retaining recess positioned in the lower surface of the radio housing near a first end thereof, said retaining recess having a configuration which receives said retaining projection and removably holds said first end of said radio housing and said first end of said battery housing together when said retaining projection is inserted into said retaining recess;

e. a latching arm pivotally mounted on said radio housing near a second end thereof opposite said first end, said latching arm having a second retaining member that is adapted to engage said first retaining member on said battery housing and to hold said second end of said radio housing and said second end of said battery housing together;

f. a separating recess positioned in the lower surface of said radio housing between said one end and said other end thereof, said separating recess having at least one separating surface that slopes inwardly from said lower surface in a direction from one of said ends of said radio housing toward the other of said ends of said radio housing;

g. and said separating surface of said separating projection and said separating surface of said separating recess being correspondingly positioned and configured so as to be substantially in registry when said radio housing and said battery housing are positioned and held together, and so that impact to said radio housing and said battery housing when so held tends to separate said housings.

2. A protective fastening arrangement for two relatively fragile objects such as a radio housing and a battery housing, said arrangement comprising:

a. a tongue and groove arrangement positioned on first corresponding ends of said two objects for removably holding said two objects together at said first ends;

b. a hasp and catch arrangement positioned on second corresponding ends of said two objects opposite said first ends for removably holding said two objects together at said second ends;

c. correspondingly sloped separating surfaces correspondingly positioned on said two objects between said first and second ends;

d. and said tongue and groove arrangement, said hasp and catch arrangement, and said separating surfaces being configured to release and separate said two objects in response to impact, whereby shock to said fragile objects is reduced.

3. The protective fastening of claim 2 wherein said hasp arrangement comprises a first pivotal arm mounted on one of said objects and a second pivotal arm mounted on said first arm, whereby pivoting of said first arm in one direction permits said second arm to engage said catch on the other of said objects, and pivoting of said first arm in a second opposite direction causes said second arm to firmly but releasably engage said catch.

4. The protective arrangement of Claim 3 wherein said second arm has a spring which, when said second arm engages said catch and said first arm is pivoted in said second direction, tends to hold said second arm in engagement with said catch.

* * * * *